United States Patent
Lewin et al.

(10) Patent No.: US 11,307,911 B2
(45) Date of Patent: Apr. 19, 2022

(54) FILE UPLOAD MODIFICATIONS FOR CLIENT SIDE APPLICATIONS

(71) Applicant: Microsoft Technology Licensing, LLC, Redmond, WA (US)

(72) Inventors: Guy Lewin, New York City, NY (US); Amir Geri, Modi'in (IL); Yossi Haber, Gannei Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/888,327

(22) Filed: May 29, 2020

(65) Prior Publication Data
US 2021/0373979 A1    Dec. 2, 2021

(51) Int. Cl.
| | |
|---|---|
| *G06F 9/54* | (2006.01) |
| *G06F 16/958* | (2019.01) |
| *G06F 16/953* | (2019.01) |
| *G06F 16/16* | (2019.01) |
| *G06F 3/0486* | (2013.01) |
| *G06F 9/48* | (2006.01) |
| *H04L 67/56* | (2022.01) |
| *H04L 67/01* | (2022.01) |

(52) U.S. Cl.
CPC ............ *G06F 9/542* (2013.01); *G06F 3/0486* (2013.01); *G06F 9/4843* (2013.01); *G06F 9/543* (2013.01); *G06F 16/16* (2019.01); *G06F 16/953* (2019.01); *G06F 16/958* (2019.01); *H04L 67/28* (2013.01); *H04L 67/42* (2013.01)

(58) Field of Classification Search
None
See application file for complete search history.

(56) References Cited

U.S. PATENT DOCUMENTS

| | | |
|---|---|---|
| 8,826,443 B1 * | 9/2014 | Raman |
| 2009/0132285 A1 | 5/2009 | Jakobovits et al. |
| 2013/0219368 A1 | 8/2013 | Carteri et al. |
| 2014/0310591 A1 | 10/2014 | Nguyen et al. |

(Continued)

OTHER PUBLICATIONS

Application as Filed in U.S. Appl. No. 16/453,511, filed Jun. 26, 2019, 33 Pages.

(Continued)

*Primary Examiner* — Syed A Roni
(74) *Attorney, Agent, or Firm* — Fiala & Weaver P.L.L.C.

(57) ABSTRACT

Methods and systems are provided for a client computing device including a browser that renders a web page. Program code generates a mock upload event and a corresponding mock data transfer object for uploading data using the web page. The mock upload event and the corresponding mock data transfer object are propagated to an upload event listener of the web page and executed. Prior to generating the mock upload event and corresponding mock data transfer object, an embedded upload event listener may receive an upload event, read the upload event, drop the received upload event from an event handler pipeline, and call synchronously or asynchronously, code to perform logic on the received upload event for the generation of the mock upload event and a corresponding mock data transfer object.

20 Claims, 6 Drawing Sheets

(56) References Cited

U.S. PATENT DOCUMENTS

2020/0412697 A1* 12/2020 Lewin

OTHER PUBLICATIONS

"Using Files from Web Applications", Retrieved From: https://web.archive.org/web/20190625015040/https://developer.mozilla.org/en-US/docs/Web/API/File/Using_files_from_web_applications, Jun. 25, 2019, 17 Pages.

"International Search Report and Written Opinion Issued in PCT Application No. PCT/US21/024753", dated Jun. 18, 2021, 12 Pages.

* cited by examiner

FILE UPLOAD MODIFICATIONS FOR CLIENT SIDE APPLICATIONS

BACKGROUND

Web pages rendered in a browser interface often provide interactive components, such as a drag-and-drop mechanism and/or a dialog box, that enable a user to select files or directories to upload to a remote system such as a server. For example, when a user drags a file or a directory into a drop box component in the web page, software on the client side device receives an upload event and dispatches the event to an event handler to retrieve the file (or a list of files in a directory), and transmit the file(s) to an identified remote system. The upload event is propagated without modification. Furthermore, when multiple files are uploaded in one event, the system either transmits all of the files or denies all of the files in the upload. Still further, all files of an upload event triggered by dragging a directory of files into a drop box are uploaded.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided in a client computing device that enable modification of upload events prior to the actual uploading. In one aspect, the client computing device includes system that includes a browser, a mock upload event generator, a dispatcher, and an event handler. The browser is configured to render a web page. The mock upload event generator includes program code configured to generate a mock upload event and a corresponding mock data transfer object for uploading data using the web page. The program code is configured to execute in the client computing device. The dispatcher is configured to propagate the mock upload event and corresponding mock data transfer object to an upload event listener of the web page. The event handler is configured to execute the mock upload event.

In some embodiments, the client computing device includes an embedded upload event listener. Prior to the mock upload event generator generating the mock upload event and mock data transfer object, the embedded upload event listener is configured to: intercept a received upload event, read the received upload event, drop the received upload event from an upload event handler pipeline, and call code to perform logic on the received upload event.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
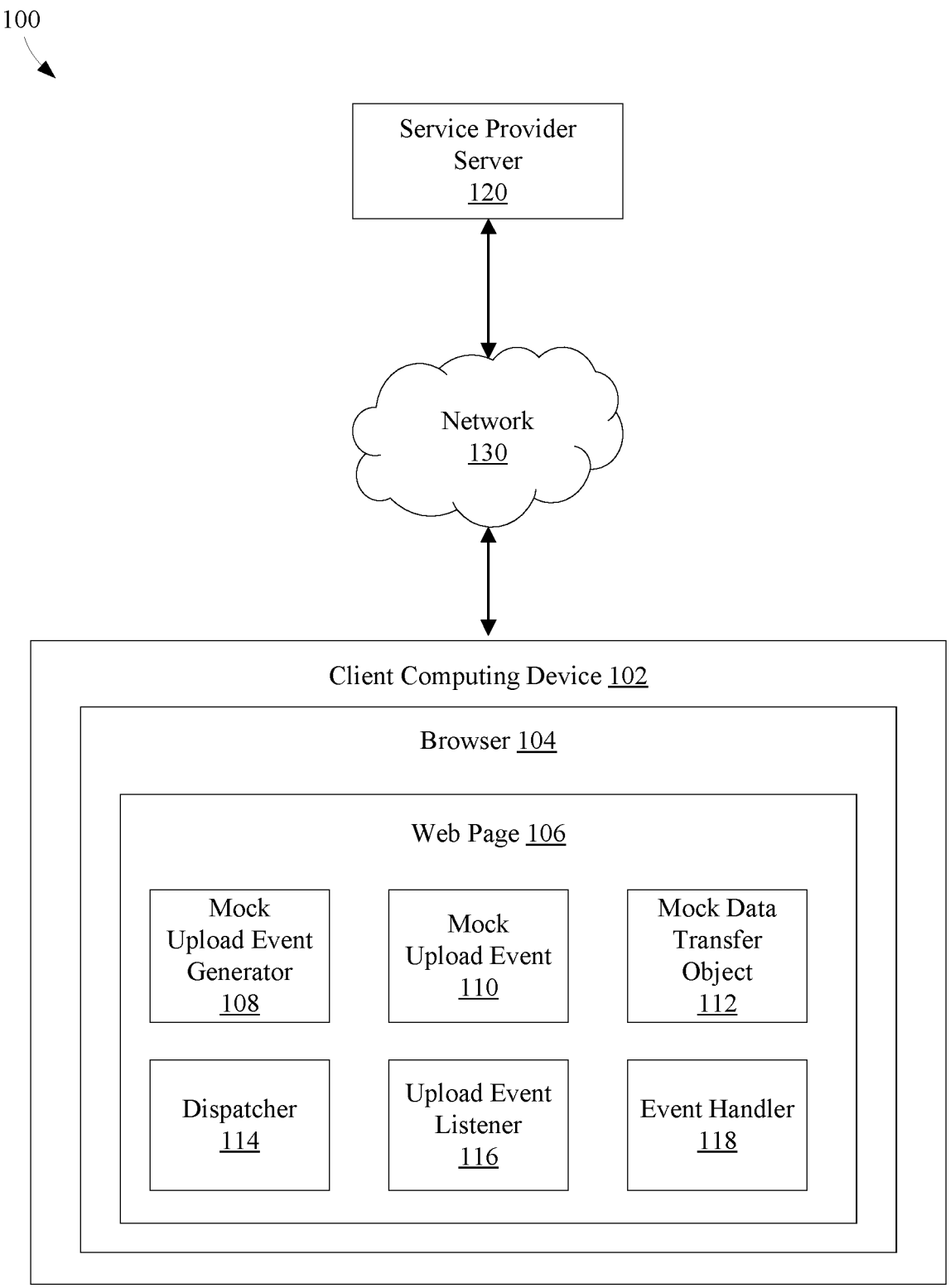
FIG. 1 is a block diagram of a system that generates a mock upload event in a web page for handling files being uploaded from a client device, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, today's browser based systems have limited capabilities when uploading files or directories of files to a remote system such as a server. For example, users may trigger an upload event in a web page using an interactive component, such as a drag-and-drop box or a dialog box, to select a file or directory for an upload operation. For instance, a file, multiple files, a directory, multiple directories, or a combination thereof may be selected (i.e., one or more files and/or one or more directories). However, once the upload event is received, the event handlers are not able to modify the event. For example, the file content or the name of a file selected for uploading cannot be modified. Also, when a group of files or a directory of files is being uploaded using a drag-and-drop box or a dialog box of the web page, the system either allows transmission all of the files, or denies uploading all of the files. The system does not allow transmission of a subset of the files while blocking transmission of a another subset of the files included in the upload event. Furthermore, when dragging and dropping a directory of files for an upload operation, individual files of the directory cannot be blocked from the upload operation based on an upload policy.

Example embodiments are described herein for controlling file and directory upload events (related to a web page) to a remote device such as a server, by generating a mock upload event. For example, a mock upload event and a corresponding mock data transfer object (e.g., an event object), suitable for processing by a browser, may be generated for uploading one or more files and/or one or more directories. The mock data transfer object may include or indicate the file(s) and/or directory(s) designated to be uploaded and corresponding metadata. The browser dispatches the mock upload event and the corresponding mock data transfer object to propagate through a path of the document object model (DOM) tree to reach a registered mock upload event listener in the DOM tree. The mock upload event and mock data transfer object may then be propagated through one or more event handlers (e.g., a chain of event handlers) to process the one or more files and/or one or more directories, and perform the upload operation according to the mock upload event and mock data transfer object. In some embodiments, a web page element (e.g., a button, drag-and-drop box, input dialog box, etc.) may be rendered in a web page to receive user input to trigger execution of the mock upload event. In other embodiments, the mock upload event may be triggered by non-user incidences, for example, a timer output, the DOM reaching a ready state, or other state changes of elements in the DOM tree, or may be triggered in other ways.

In some embodiments, a user activated interactive element that triggers generation of the mock event for upload operations may be an existing input element in a web page for selecting files or directories for upload, for example, a dialog box or drop box for a drag-and-drop operation (e.g., to upload file(s) and/or directory(s) to a server). When the existing upload input element is activated by the user, an upload event is received. A mock upload event listener may be embedded in an element of the DOM tree above (prior to) any other DOM element comprising an event listener registered to capture the received upload event (e.g., the event triggered by drag-and-drop or dialog box input). The embedded mock upload event listener may capture, read, and/or analyze the received upload event, and may drop the received upload event from the event processing flow of the DOM. The embedded mock upload event listener may call (synchronously or asynchronously) code to perform logic relative to the received upload event. For example, the called code may generate a mock upload event and mock data transfer object suitable for processing by the browser (e.g., based on the received upload event) to replace the received upload event. As described above, the mock data transfer object may include file(s) and/or directory(s) designated in the received upload event (e.g., designated based on a drag-and-drop gesture or selection in a dialog box). The embedded mock upload event listener may send the mock event with the mock data transfer object (e.g., as an argument) to an event handler and it may be propagated through one or more event handlers to process the one or more files and/or one or more directories, and perform the upload operation according to the mock upload event and mock data transfer object.

In some embodiments, the mock upload event may be generated based on the original received (or existing) upload event. For example, the mock upload event may include additional, fewer, or different processing steps than the received upload event. In some embodiments, the mock upload event may add steps for modifying content of one or more files (e.g., encrypting files) and/or renaming one or more files before an upload operation. In some embodiments, the mock upload event may indicate that upload of a portion or subset of the files or directories indicated in the mock data transfer object may be blocked while upload of other files indicated in the data transfer object may be allowed. Furthermore, individual files of a directory selected by a user in a drag-and-drop gesture denial for an upload operation may be allowed or blocked based on inspection of an upload policy. The upload policy may be stored local to the client computing device or stored on a remote device such as a proxy server or a web server.

In some embodiments, the embedded mock upload event listener transmits a query to a proxy server. The query includes a request regarding the designated file(s) and/or directory(s). The proxy server returns instructions in a response to the embedded mock event listener for processing the file(s) and/or directory(s) prior to uploading them to a service provider server, or for denying upload of one or more of the files and/or directories. The proxy service may determine the instructions based on file upload policies as applied to the upload request. For example, the upload policies may indicate criteria for taking certain actions or indicate how to treat certain types of files or directories (e.g., modify file content, encrypt file content, rename a file, deny transmission of certain types of files, etc.). The mock event generator generates the mock upload event and corresponding mock data transfer object based on the returned instructions from the proxy server.

The mock upload event generator described herein may take various forms, for example, as a browser extension written in a scripting language code (e.g., JavaScript® developed by Mozilla Foundation of Mountain View, Calif.), scripting language code that alters an existing event that is received via a web page element, new scripting language code, scripting language code injected as a hook library in the web page, or other scripting language code.

Embodiments for generating a mock upload event in a web page may be implemented in various ways. For instance, FIG. 1 is a block diagram of a system 100 that generates a mock upload event in a web page for handling files being uploaded from a client device, according to an example embodiment. As shown in FIG. 1, system 100 includes a client computing device 102 and a service provider server 120 that are communicatively coupled by a network 130. Client computing device 102 includes a browser 104, which renders a web page 106. Web page 106 includes a mock upload event generator 108, a mock upload event 110, a mock data transfer object 112, a dispatcher 114, an upload event listener 116, and an event handler 118.

Client computing device 102 may be any suitable computing device, such as a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo WHO or Switch®, etc.), an appliance, a set top box, etc.

Service provider server 120 is implemented in one or more computing devices, such as a desktop computer, a server, a mobile device, etc. Service provider server 120 is configured to respond to requests received via network 130 from client computing device 102. Service provider server 120 may be a web server comprising one or more websites and may process incoming network requests received from client computing device 102 via network 130 using Hypertext Transfer Protocol (HTTP) and other related protocols. Service provider server 120 may be configured to store, process and deliver web pages and content to client computing device 102. For example, web pages delivered to client computing device 102 may include hypertext markup language (HTML) documents, which may comprise images, hyperlinks, files, style sheets, scripts, graphics, text content, etc. Network 130 may be or include any type of communication network, including a local area network (LAN), a wide area network (WAN), a personal area network (PAN), or a combination of communication networks, such as the Internet.

Client computing device 102 is configured to communicate with service provider server 120 via network 130. Client computing device 102 may be configured to transmit a request to service provider server 120 to access a service provided thereby. For example, web browser 104 may be a client application, running in client computing device 102, which is configured to connect to a web server of service provider server 120 and retrieve web pages such as web page 106 for rendering at client computing device 102. In an embodiment, browser 104 is configured to construct a DOM tree based on web page 106, render content of web page 106, and display web page 106 in display regions of a user interface (e.g., in a tab of browser 104) of client computing device 102.

In some embodiments, web page 106 is accessed from service provider server 120 when web browser 104 receives a uniform resource locator (URL) address as user input via an address bar (not shown) of web browser 104. Web page 106 is a document that may be written in HTML (hypertext markup language) or other suitable language, and may include or reference code for execution written in a scripting language such as JavaScript® for implementing dynamic behavior. Web page 106 may be rendered in web browser 104 to include interactive elements (e.g., a drag-and-drop box, a dialog box, a button, etc.) for receiving user input. For example, the interactive elements may be used to initiate a file or directory upload operation in order to upload one or more files and/or one or more directories to service provider 120 server.

Note that although the JavaScript® scripting language and JavaScript® scripts are frequently discussed herein with respect to embodiments, they are discussed for illustrative purposes, and further types of scripting languages are applicable in embodiments.

Mock upload event generator 108 may include scripting language code (e.g., JavaScript®) that is configured to generate mock upload event 110 and mock data transfer object 112 for processing and uploading file(s) and/or directory(s) to service provider server 120. Mock upload event 110 may be a scripting language event object (e.g., a JavaScript® event) that may be created by calling a constructor in JavaScript®, which builds the mock upload event 110. Mock data transfer object 112 may be generated separately and may be included within mock upload event 110. Mock data transfer object 112 is a valid data structure for browser 104. The structure of mock data transfer object 112 mocks or mimics the structure of a data transfer object that would otherwise be natively created by browser 104. In other words, one of the properties in the mock upload event 110 is the mock data transfer object 112 that has a structure that mocks the structure of an object created by calling an existing JavaScript® constructor. Mock data transfer object 112 holds the data that is selected for uploading to service provider server 120. Mock upload event 110 is configured to cause a mocked or altered execution flow to proceed for file or directory processing and/or upload actions. Mock upload event 110 may cause analysis and/or processing of files or directories prior to transmitting the file(s) and/or directory(s) to service provider server 120. Mock data transfer object 112 may be utilized for the processing and/or upload operation. For example, mock data transfer object 112 may include metadata such as file name(s) or file size(s), or content of the file(s). In some embodiments, metadata of mock data transfer object 112 may also include file locations in a directory and/or subdirectories.

Dispatcher 114 may include code configured to dispatch mock upload event 110, with mock data transfer object 112 included as an argument, to an execution flow of web page 106 to perform processing and an upload operation on the files designated (or included) in mock data transfer object 112, according to mock upload event 110. For example, upload event listener 116 may receive mock upload event 110 and mock data transfer object 112 from dispatcher 114 and forward them to event handler 118 to propagate the execution flow based on mock upload event 110 and mock data transfer object 112. In some embodiments, event handler 118 may include a plurality of event handlers, (e.g., a chain of event handlers through which mock upload event 110 and/or mock data transfer object 112 are propagated).

Mock upload event generator 108 may be triggered to execute in various ways. For example, a button may be rendered in web page 106 that is configured to receive user input (e.g., a click), which triggers mock upload event generator 108 to generate mock upload event 110 and mock data transfer object 112. In another example, a timer may be configured in web page 106 or browser 104 to trigger mock upload event generator 108 to generate mock upload event 110 and a mock data transfer object 112 on a periodic basis, or at one or more specified times. In another example, mock upload event generator 108 may be triggered to generate mock upload event 110 and mock data transfer object 112 when page 106 is fully loaded into browser 104, or based on progress of an asynchronous task.

In some embodiments, upload event listener 116 and/or event handler 118 may be registered in the DOM tree of web page 106 and may be defined for performing one or more operations on one or more files and/or one or more directories before transmission of the same to service provider server 120. For example, event handler 118 may be configured to rename a file(s) before uploading the file(s) (e.g., renaming a file to include a user name or a date in the file name, etc.). In another example, event handler 118 may be configured to modify the content of one or more files prior to an upload operation (e.g., encrypt a file or redact portions of a file(s), etc.). In another example, event handler 118 is configured to analyze mock upload event 110 and mock data transfer object 112 and determine, for each file or directory designated, whether an upload operation should be allowed or blocked. For example, prior to uploading a directory of files, event handler 118 may be configured to analyze each file of the directory relative to a defined upload criteria or policy, and may upload only the files from the directory that meet the criteria or satisfy the policy. Alternatively or in addition, event handler 118 may be configured to modify one or more of the files of the directory to meet the criteria or policy prior to uploading the directory or one or more files from the directory. Moreover, event handler 118 may be configured to change a list of files in a directory or create a file system for uploading to service provider server 120.

In one embodiments, event handler 118 is configured to create a file or files to be uploaded to service provider server 120. For example, a file upload button element may be added to web page 106 as a browser extension (e.g., using script code). Unlike with existing file upload drag-and-drop input elements or file upload dialog box input elements, which may allow a user to choose one or more files and/or one or more directories for uploading, user input received at the browser extension file upload button (e.g., a click) may trigger mock upload event generator 108 to generate a mock upload event 110 and mock data transfer object 112. Mock upload event 110 may be captured by event listener 116 and propagated through event handler 118. Event listener 116 may be configured to create a new file, fill the file with some content, and upload the new file to service provider server 120. This example use case may enable a developer to test a web site upload process by generating a new file and uploading it to service provider server 120.

Mock upload event generator 108 may be configured in various ways. For example, mock upload event generator 108 may be a browser extension including code written in a scripting language (e.g., JavaScript®). In another example, mock upload event generator 108 may comprise a hook library that includes hook software configured to intercept a received upload event that is passed to the DOM, and generate a mock upload event 110 and a mock data transfer object 112 to propagate in a "mock" execution flow (e.g., for modifying a file or modifying the upload operation), which is different from the normal execution flow for the received upload event. The "mock" execution flow may include processing by event handler 118.

Figure 2:
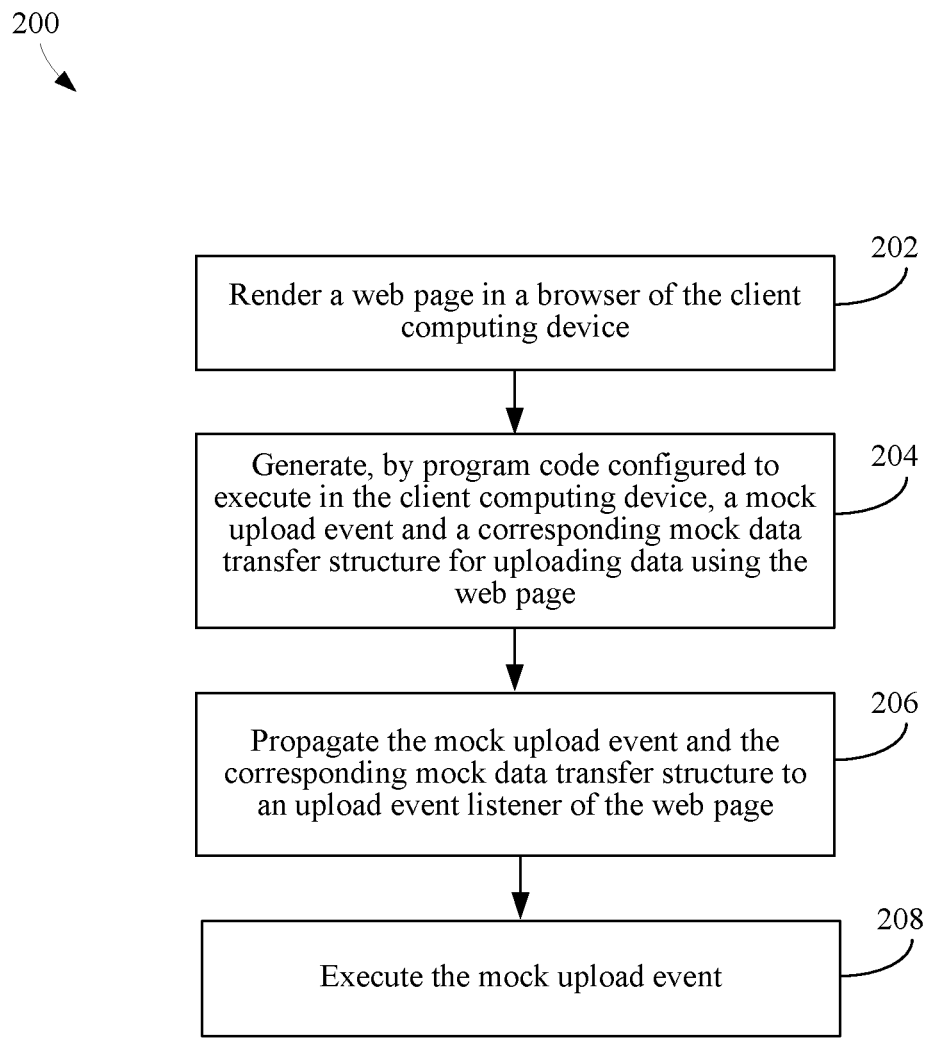
FIG. 2 is a flowchart providing a method for generating a mock upload event for handling of files being uploaded from a client device, according to an example embodiment.

In embodiments, system 100 may operate in various ways to perform its functions. For example, FIG. 2 is a flowchart 200 providing a method for generating mock upload event 110 from web page 106, for handling files to be uploaded from client device 102, according to an example embodiment. In one embodiment, flowchart 200 may be performed by client computing device 102, and in particular, by browser 104. For the purposes of illustration, flowchart 200 of FIG. 2 is described with reference to FIG. 1.

Flowchart 200 of FIG. 2 begins with step 202. In step 202, a web page is rendered in a browser of the client computing device. For example, browser 104 may receive a URL, based on input by a user, that addresses web page 106 at service provider server 120. Browser 104 may transmit a request for web page 106 to service provider server 120, and in response, receive web page 106 from service provider server 120. Browser 104 then renders web page 106, retrieving objects indicated in web page 106 (e.g., images, videos, etc.) as needed for the rendering. In some embodiments, web page 106 may include interactive elements for receiving user input (e.g., a drag-and-drop box, a dialog box, a browser extension button for mock upload events, etc.). The interactive elements may be used to initiate file and/or directory upload operations to process and upload one or more files and/or one or more directories to service provider 120 server. Browser 104 may construct a DOM for web page 106 and register upload event listener 116 and event handler 118 in one more elements of the DOM.

In step 204, program code configured to execute in the client computing device generates a mock upload event and a corresponding data transfer object for uploading data using the web page. For example, mock upload event generator 108 may execute in client computing device 102 to generate mock upload event 110 and mock data transfer object 112 for processing and/or uploading one or more files and/or one or more directories from client computing device 102 to service provider server 120 over network 130. Execution of mock upload event generator 108 may be triggered in various ways, for example, by user input (e.g., a click event) in an element rendered in web page 106, or by non-user incidences, for example, a timer output, the DOM reaching a ready state, or other state changes of elements in the DOM tree. Mock data transfer object 112 may include metadata such as file name(s), file size(s), or content of the file(s). In some embodiments, mock data transfer object 112 may also include file locations in a directory and/or subdirectories. In some embodiments, mock upload event generator 108 may create a new file to upload, fill the new file with content, and include the new file (or designate the new file) in mock data transfer object 112. Alternatively or in addition, mock upload event generator 108 may create a directory of files to upload, and include it (or designate it) in mock data transfer object 112.

In step 206, the mock upload event and the corresponding data transfer object are propagated to an upload event listener of the web page. For example, dispatcher 114 may dispatch mock upload event 110 with mock data transfer object 112, included as an argument, to an execution flow of the DOM of web page 106. For example, upload event listener 116 may receive mock upload event 110 and mock data transfer object 112 from dispatcher 114 and forward them to event handler 118 to propagate the execution flow based on mock upload event 110 and mock data transfer object 112. In some embodiments, event handler 118 may include a plurality of event handlers, (e.g., a chain of event handlers through which mock upload event 110 and/or mock data transfer object 112 are propagated).

In step 208, the mock upload event is executed. For example, event handler 118 may process or create one or more files and/or one or more directories designated in mock data transfer object 112 and upload one or more files and/or one or more directories to service provider server 120 via network 130. As described above, in one example, event handler 118 may rename one or more files before uploading the file(s) (e.g., rename a file to include a user name or a date in the file name, etc.). In another example, event handler 118 may modify the content of one or more files prior to an upload operation (e.g., encrypt a file or redact portions of a file, etc.). In another example, event handler 118 may analyze mock upload event 110 and mock data transfer object 112, and determine for each file designated, whether an upload operation should be allowed or denied. For example, prior to uploading a directory of files, event handler 118 may analyze each file of the directory relative to a defined upload criteria or policy, and upload only the files from the directory that meet the criteria or satisfy the policy. Alternatively or in addition, event handler 118 may modify one or more of the designated files to meet the criteria or policy prior to uploading one or more files from the directory. Moreover, event handler 118 may change a list of files in a directory or create a file system for uploading to service provider server 120. In one embodiment, event handler 118 is configured to create a file or files to be uploaded to service provider server 120. For example, based on a user input trigger via an element in web page 106, or based on a non-user incidence trigger in web page 106 or browser 104 (e.g., timer output, DOM state, etc.), mock upload event generator 108 may generate mock upload event 110 and mock data transfer object 112. Mock upload event 110 and mock data transfer object 112 may be captured by event listener 116 and propagated through event handler 118. Event handler 118 may create a new file, fill the file with content, and upload the new file to service provider server 120.

Figure 3:
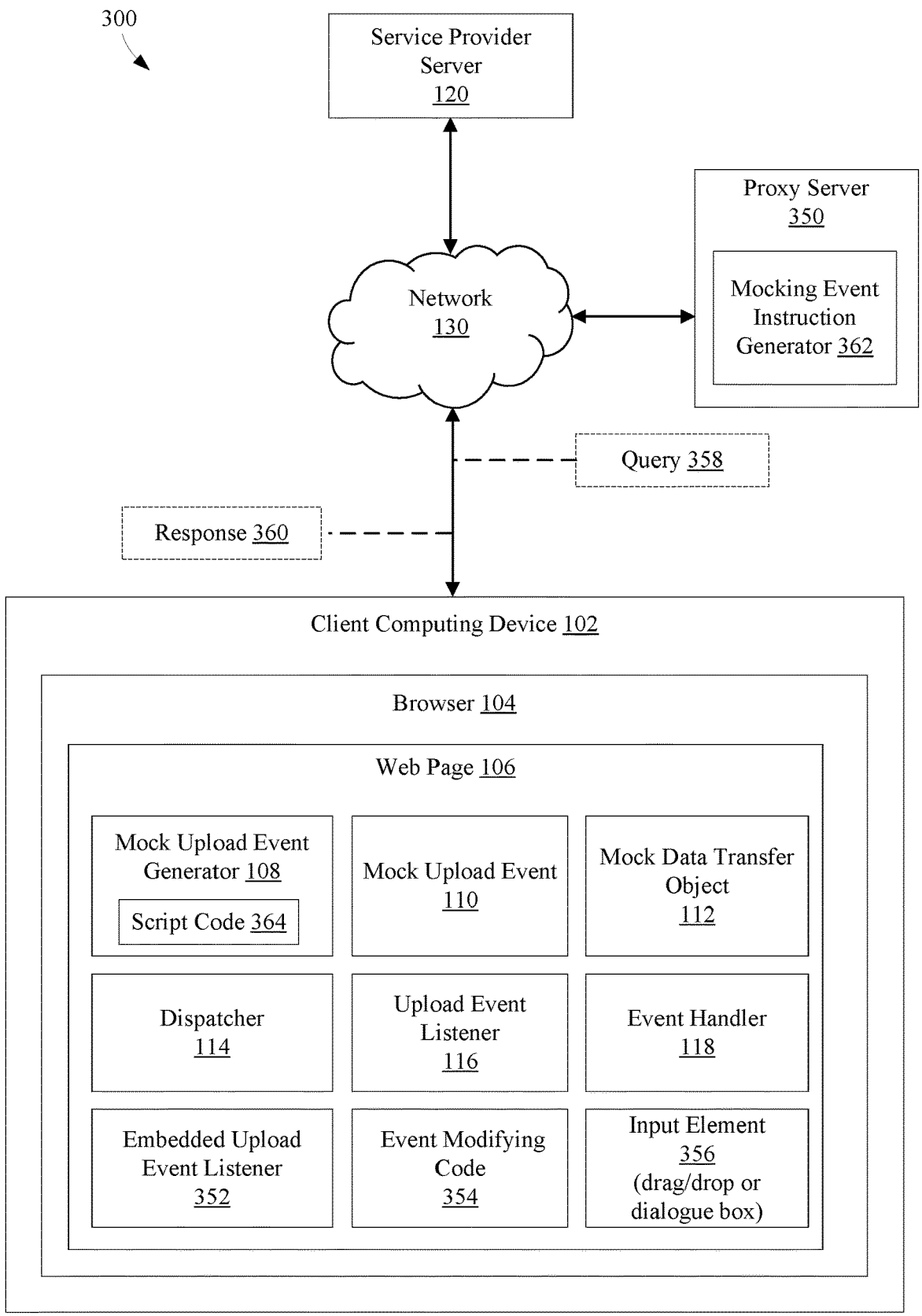
FIG. 3 is a block diagram of a system for intercepting a received upload event by an embedded upload event listener, and generating a mock upload event based on the received upload event, according to an example embodiment.

Embodiments for generating a mock upload event in a web page may be implemented in various ways. For instance, FIG. 3 is a block diagram of a system 300 for intercepting a received upload event by an embedded upload event listener, and generating a mock upload event based on the received upload event, according to an example embodiment. As shown in FIG. 3, system 300 includes elements of system 100 and additional elements. System 300 includes client computing device 102, service provider 120, and a proxy server 350, which are all communicatively coupled by network 130. Client computing device 102 includes browser 104, which loaded and renders web page 106. Web page 106 includes mock upload event generator 108, mock upload event 110, mock data transfer object 112, dispatcher 114, upload event listener 116, event handler 118, an embedded upload event listener 352, event modifying code 354, and an input element 356. Proxy server 350 includes a mocking event instruction generator 362. These features of system 300 are further described as follows.

In some embodiments, mock upload event generator 108 may generate mock upload event 110 and mock data transfer object 112 by modifying actual file upload events that are triggered based on dragging and dropping, or choosing files from a dialog box in web page 106. An issue that arises with modifying file uploads is that different web services have different protocols between the client side and the server side (e.g., form-multipart, different asynchronous JavaScript and XML (AJAX) methods, JavaScript object notation (JSON) post). However, web browsers tend to implement the same API for receiving files from the client itself regardless of the client-server protocol implementation. Example APIs include: (1) dragging and dropping files and/or directories (e.g., folders) into the browser; and (2) selecting files and/or directories from <input type="file"/>(e.g., choosing files from a dialog box). By filtering these APIs at the first (i.e., topmost) DOM element on the capture phase, all file upload attempts can be modified or selectively allowed or blocked (including selectively allowing or blocking individual files in a directory based on a policy), while making sure that no file content is being read by the browser without approval.

Embedded upload event listener 352 is configured to intercept a received upload event that is triggered when a user selects files and/or directories for an upload operation by dragging and dropping files and/or directories, or choosing files and/or directories from a dialog box of input element 356 in web page 106 (as described above). For example, in instances where web page 106 receives user input to initiate a file upload action via a drag-and-drop or dialog box input of element 356, a JavaScript® event is created. JavaScript® event propagation in the DOM includes three phases: (1) capture (down), (2) target and (3) bubbling (up). Embedded event listener 352 may be registered during DOM initialization high on the DOM tree on the capture phase (e.g., on the window or topmost object of the DOM), such that code of embedded event listener 352 is the first code executed in response to the user's attempt to upload the file utilizing the drag-and-drop or dialog box file selection of input element 356. Thereby, embedded event listener 352 is configured to intercept the original JavaScript® event.

By intercepting the original JavaScript® event that was triggered by the user's upload request based on drag-and-drop or dialog box input, embedded upload event listener 352 may preempt normal pipeline processing for the original JavaScript® event and provide an alternate flow for file or directory upload control. For example, embedded upload event listener 352 may read the original received upload event destined for the normal upload event handler pipeline, and call, synchronously or asynchronously, event modifying code 354 of mock event generator 108. Event modifying code 354 is configured to perform logic on the original received upload event to generate mock upload event 110. For example, event modifying code 354 may modify or replace the original JavaScript® event to generate mock upload event 110 and mock data transfer object 112, which may be propagated in a mock or altered execution flow through event handler 118. In this regard, event modifying code 354 of mock upload event generator 108 may be script code injected as a hook library in web page 106.

Mock upload event 110 may trigger additional, fewer, or different processing steps than the received original upload JavaScript® event. For example, mock upload event 110 may cause added steps for modifying content of one or more files (e.g., encrypting files) and/or renaming one or more files. In some embodiments, mock upload event 110 may cause upload of a subset of the files or directories indicated in mock data transfer object 112 to be blocked while other files may be allowed to upload. Furthermore, the denial or allowance of an upload operation for one or more files, one or more files of a directory, and/or one or more directories may be determined based on inspection of an upload policy that may be stored local to client computing device 102 or on a remote device such as proxy server 350 or service provider server 120.

As described above, mock upload event generator 108 may take various forms. For example mock upload event generator 108 may be or include a browser extension that may be written in a scripting language (e.g., JavaScript®) such as script code 364. In another example, mock upload event generator 108 may include scripting language code that alters an existing event (e.g., an event triggered by drag-and-drop or dialog box input), such as event modifying code 354. In another example, mock upload event generator 108 may include new scripting language code associated with a non-user incident trigger or user input at a new input element of web page 106, such as an upload button. In another example, mock upload event generator 108 may include scripting language code that is injected as a hook library in web page 106.

In general, in networked computer systems, proxy services are sometimes used to monitor internet traffic and enforce policy restrictions on user activities. However, when a user of a client device uses a client-side application that executes on the client (e.g., a browser application or word processing application), the proxy service may be unable to monitor the activities undertaken by the user using the client-side application. For example, when a user uploads a document from client computing device 102, proxy server 350 may not detect the user action to be able to apply policy rules, such as file or directory upload policies defined by an administrator of a tenant domain. As a result, the user may be able to perform actions that the administrator sought to prevent in defining the policy rules (e.g., uploading unencrypted files or uploading certain restricted files).

Figure 4:
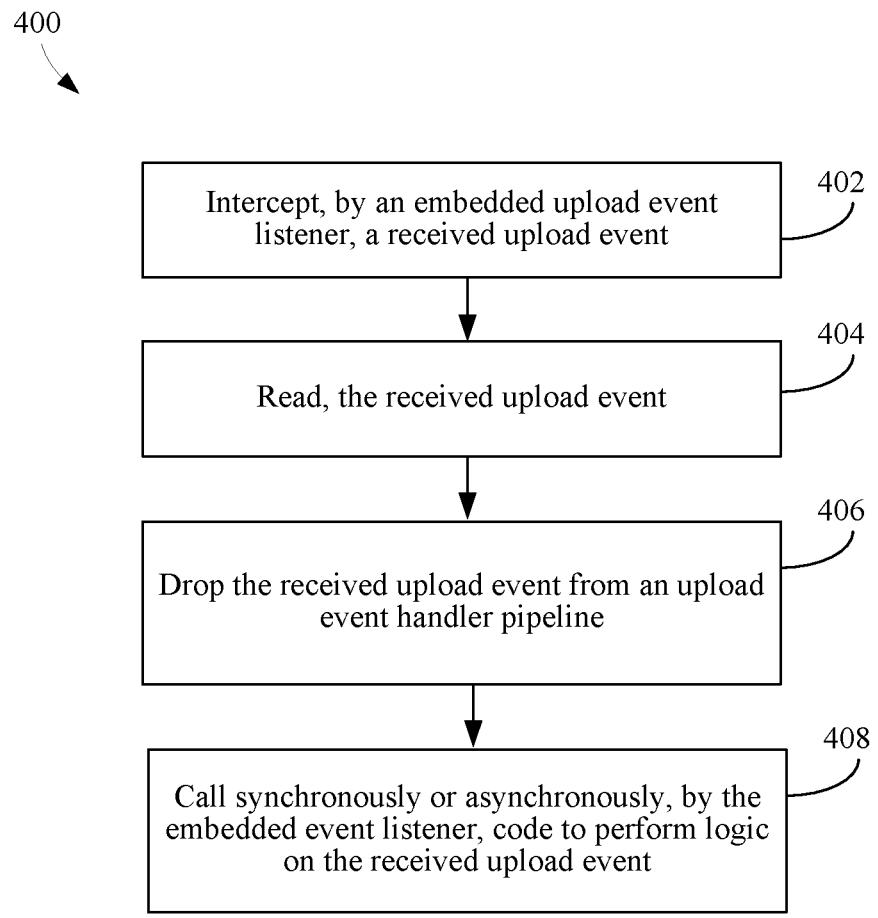
FIG. 4 is a flowchart providing a method for intercepting a received upload event by an embedded upload event listener and calling code to perform logic on the received upload event, according to an example embodiment.

System 300 may operate in various ways to perform its functions. For example, FIG. 4 is a flowchart 400 providing a method for intercepting a received upload event by an embedded upload event listener and calling code to perform logic on the received upload event, according to an example embodiment. In one embodiment, flowchart 400 may be performed by client computing device 102. For the purposes of illustration, flowchart 400 of FIG. 4 is described as follows with reference to FIG. 3.

Flowchart 400 begins with step 402. In step 402, an embedded upload event listener intercepts a received upload event. For example, an original upload JavaScript® event may be triggered by input received when a user selects one or more files and/or one or more directories for upload using a drag-and-drop box or dialog box of input element 356. Dispatcher 114 may dispatch the original upload JavaScript® event to the DOM. Embedded upload event listener 352 may be registered above the event listener that normally captures the original upload JavaScript® event such that code of embedded event listener 352 is first to capture the original JavaScript® event. In one example, embedded event listener 352 may be registered during DOM initialization on the window (e.g., the topmost object) of the DOM on the capture phase, such that code of embedded event listener 352 is the first code that runs when the user attempts the file upload utilizing file selection via the drag-and-drop box or dialog box of input element 356, thereby intercepting the original upload JavaScript® event.

In step 404, the received upload event is read. For example, embedded upload event listener 352 may read and/or analyze the original upload JavaScript® event. In an embodiment, embedded upload event listener 352 determines the original JavaScript® event is an event type that is to be discarded in lieu of a replacement, or to be modified. For instance, the event type may relate to a particular user interface element that triggers the event, a particular in page event type, or other type of event that is desired to be discarded or modified (e.g., in a list of event types for discard or modification).

In step 406, the received upload event is dropped from an upload event handler pipeline. For example, embedded event listener 352 may drop the original upload JavaScript® event from the normal execution flow of event handlers that are registered in the DOM for handling upload events triggered by file selection input received for an upload operation, from the drag-and-drop box or dialog box of input element 356.

In step 408, the embedded event listener calls, synchronously or asynchronously, code to perform logic on the received upload event. For example, embedded event listener 352 may call event modifying code 354 of mock upload event generator 108 to generate a mock upload event 110 and corresponding mock data transfer object 112. As described above, event modifying code 354 may modify or replace the original upload JavaScript® event with mock upload event 110, which may trigger additional, fewer, or different processing steps than the received original upload JavaScript® event. For example, mock upload event 110 may include added steps for modifying content and/or renaming one or more files, or for allowing or blocking a subset of the files or directories indicated in mock data transfer object 112. Furthermore, the upload of one or more files of a directory may be individually allowed or blocked based on inspection of an upload policy that may be stored local to the client computing device or on a remote device such as proxy server 350 or service provider server 120.

Referring again to FIG. 3, in some embodiments, system 300 includes proxy server 350. Proxy server 350 may be communicatively coupled to service provider server 120 and client computing device 102 via network 130. Service provider server 102 may support services and/or content that can be accessed by client computing device 102 through proxy server 350 via network 130. When client computing device 102 attempts to access content and/or services on service provider server 120 (e.g., uploading one or more files and/or one or more directories to service provider sever 120), the access may be monitored, controlled, and/or routed through proxy server 350.

Proxy server 350 may include mocking event instruction generator 362 that includes code for applying rules and/or policies to requests from client computing device 102 for uploading one or more files and/or one or more directories to service provider server 120.

In some embodiments, prior to generating mock upload event 110, mock upload event generator 108 is configured to send query 358 to proxy server 350, via network 130. Query 358 may include a request regarding the upload of one or more files and/or one or more directories to service provider server 120. Query 358 may identify the one or more files and/or one or more directories and include metadata regarding the one or more files and/or one or more directories. Alternatively or in addition, query 358 may include the one or more files and/or one or more directories indicated in the request. Mocking event instruction generator 362 of proxy server 350 may be configured to determine the instructions sent in a response 360 to embedded mock event listener 352 for processing the one or more files and/or one or more directories (e.g., modifying file content or renaming files), prior to an upload operation. Alternatively or in addition, mocking event instruction generator 362 may be configured to determine the instructions sent in response 360, which individually deny or allow upload of one or more of the files, one or more of the directories, and/or one or more files of a directory of query 358. Mocking event instruction generator 362 may be configured to determine the instructions based on file upload policies and or rules as applied to the upload request. For example, the upload policies may indicate criteria for taking certain actions or indicate how to treat certain files or directories (e.g., modify file content, encrypt file content, rename a file, deny transmission of certain types of files and/or directories, etc.). Mock event generator 108 may be configured to receive the instructions in response 360 and generate mock upload event 110 and corresponding mock data transfer object 112 based on the returned instructions from proxy server 350.

Figure 5:
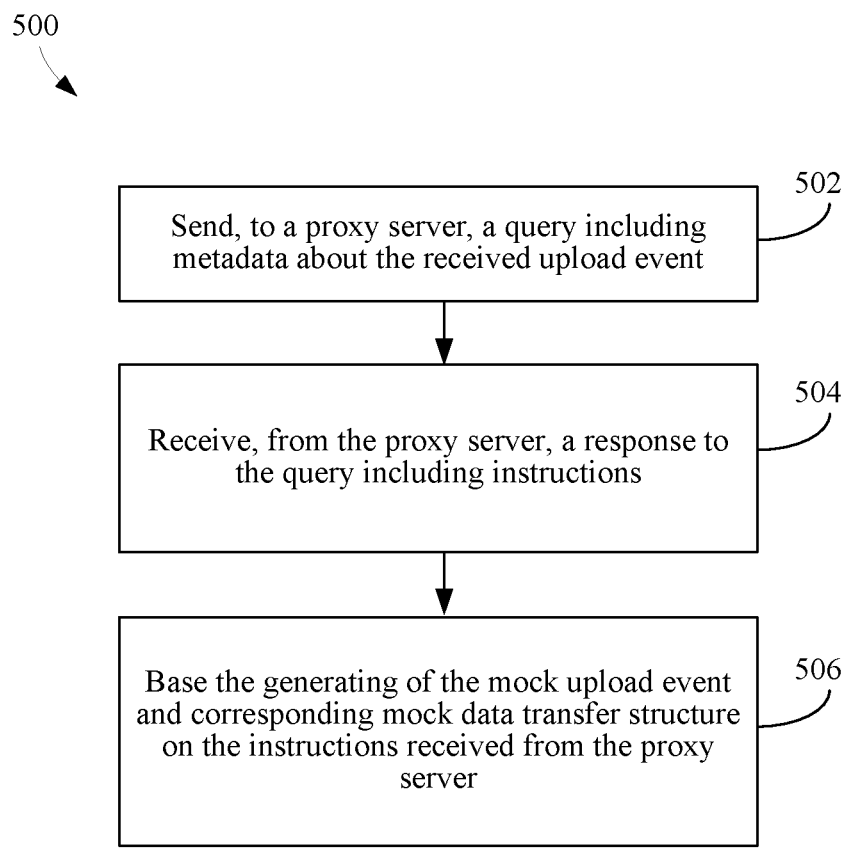
FIG. 5 is a flowchart providing a method for sending a query about a received upload event to a server and receiving a response including an instruction for generating a mock upload event, according to an example embodiment.

As described above, system 300 may perform in various ways to perform its functions. For example, FIG. 5 is a flowchart 500 providing a method for sending a query about a received upload event to a server and receiving a response including an instruction for generating a mock upload event, according to an example embodiment. In one embodiment, steps of flowchart 500 may be performed by client computing device 102. For the purposes of illustration, flowchart 500 of FIG. 5 is described as follows with reference to FIG. 3.

Flowchart 500 begins with step 502. In step 502, a query including metadata about the received upload event is sent to a proxy server. For example, mock upload generator 108 sends query 358 to proxy 350 prior to generating mock upload event 110 and mock data transfer object 112. Query 358 may include an upload request for one or more files and/or one or more directories specified in query 358.

In step 504, a response to the query, including instructions, is received from the proxy server. For example, mocking event instruction generator 362 may determine instructions for generating a mock upload event 110 and mock data transfer object 112 based on file upload policies as applied to the upload request of query 358. The upload policies may indicate criteria for taking certain actions or indicate how to treat certain files or directories (e.g., modify file content, encrypt file content, rename a file, deny transmission, etc. of certain types of files). The instructions may be sent in response 360 and received by client computing device 102.

In step 506, the generating of the mock upload event and corresponding mock data transfer object is based on the instructions received from the proxy server. For example, mock event generator 108 may generate mock upload event 110 and mock data transfer object 112 based on the instructions received from proxy server 350 in response 360.

For example, in one embodiment, embedded mock upload event listener 352 sends query 358 to proxy server 350 including a request regarding designated one or more files and/or one or more directories. Proxy server 350 may return instructions to embedded mock event listener 352 for processing the one or more files and/or one or more directories prior to uploading the one or more files and/or one or more directories. Mocking event instruction generator 362 may determine the instructions based on file upload policies as applied to the upload request. For example, the upload policies may indicate criteria for taking certain actions or indicate how to treat certain files or directories (e.g., modify file content, encrypt file content, rename a file, deny transmission of certain types of files, etc.). Mock event generator 108 may generate mock upload event 110 and corresponding mock data transfer object 112 based on the returned instructions in response 360 from proxy server 350.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

Figure 6:
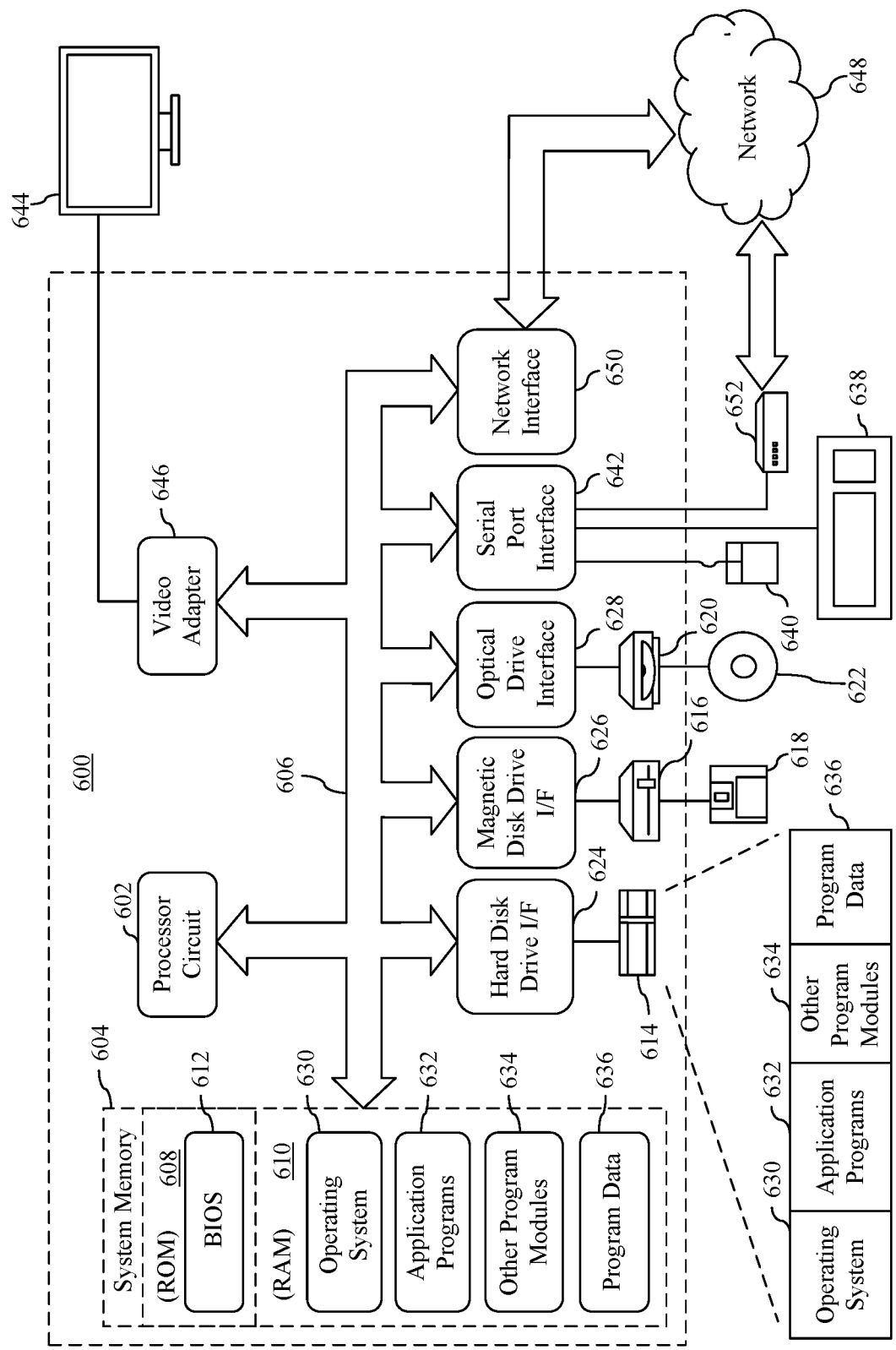
FIG. 6 is a block diagram of an example processor-based computer system that may be used to implement various embodiments.

As noted herein, the embodiments described, including but not limited to, system 100 of FIG. 1, system 300 of FIG. 3, and system 600 of FIG. 6, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 6 is a block diagram of an example processor-based computer system 600 that may be used to implement various embodiments. Client computing device 102, service provider server 120, network 130, and proxy server 350 may each include any type of computing device, mobile or stationary, such as a desktop computer, a server, a video game console, etc. For example, any of client computing device 102, service provider server 120, network 130, and proxy server 350 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo WHO or Switch®, etc.), etc.

Client computing device 102, service provider server 120, network 130, and proxy server 350 may each be implemented in one or more computing devices containing features similar to those of computing device 600 in stationary or mobile computer embodiments and/or alternative features. The description of computing device 600 provided herein is provided for purposes of illustration, and is not intended to be limiting. Embodiments may be implemented in further types of computer systems, as would be known to persons skilled in the relevant art(s).

As shown in FIG. 6, computing device 600 includes one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random-access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing client computing device 102, service provider server 120, network 130, proxy server 350, browser 104, web page 106, mock upload event generator 108, script code 364, mock upload event 110, mock data transfer object 112, dispatcher 114, upload event listener 116, event handler 118, embedded upload event listener 352, event modifying code 354, input element 356, mocking event instruction generator 362, query 358, response 360, flowchart 200, flowchart 400, flowchart 500, and/or further embodiments described herein. Program data 636 may include mock upload event 110, mock data transfer object 112, query 358, response 360, and/or further embodiments described herein.

A user may enter commands and information into computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 642, or any other interface type. Such computer programs, when executed or loaded by an application, enable computing device 600 to implement features of embodiments discussed herein. Accordingly, such computer programs represent controllers of computing device 600.

Embodiments are also directed to computer program products comprising computer code or instructions stored on any computer-readable medium. Such computer program products include hard disk drives, optical disk drives,

IV. Additional Examples and Advantages

In an embodiment, a system in a client computing device comprises: a browser configured to render a web page; a mock upload event generator including program code configured to generate a mock upload event and a corresponding mock data transfer object for uploading data using the web page. The program code is configured to execute in the client computing device. A dispatcher is configured to propagate the mock upload event and the corresponding mock data transfer object to an upload event listener of the web page. An event handler is configured to execute the mock upload event.

In an embodiment, the data includes a file, a plurality of files, a directory, or a plurality of directories.

In an embodiment, the mock upload event performs at least one of: modifying a file, changing a file name, changing content of a file, creating a file, changing a list of files in a directory, or creating a file system.

In an embodiment, the system further comprises: an embedded upload event listener. Prior to the mock upload event generator generating a mock upload event and a corresponding mock data transfer object for uploading data using the web page, the embedded upload event listener is configured to: intercept a received upload event; read the received upload event; drop the received upload event from an upload event handler pipeline; and call, synchronously or asynchronously, code to perform logic on the received upload event.

In an embodiment, the program code configured to generate a mock upload event and a corresponding mock data transfer object for uploading data using the web page is configured to modify the received upload event.

In an embodiment, the embedded upload event listener is configured to respond to a drag-and-drop input or a selection input in a dialog element input of the web page.

In an embodiment, the embedded upload event listener is registered to be executed prior to any other event listeners of the web page.

In an embodiment, the mock upload event generator is configured to: send, to a proxy server, a query including metadata about the received upload event; and receive, from the proxy server, a response to the query including instructions. The mock upload event generator including program code is further configured to generate the mock upload event and the corresponding mock data transfer object based on the instructions received from the proxy server.

In an embodiment, the mock upload event generator includes at least one of: script browser extension code; script code that alters a received event; new script code; script code injected as a hook library in the web page.

In an embodiment, the mock upload event generator is script code of a scripting language.

In an embodiment, a method in a client computing device, comprises: rendering a web page in a browser of the client computing device; generating, by program code configured to execute in the client computing device, a mock upload event and a corresponding mock data transfer object for uploading data using the web page; propagating the mock upload event and the corresponding mock data transfer object to an upload event listener of the web page; and executing the mock upload event.

In an embodiment, the mock upload event performs at least one of: modifying a file, changing a file name, changing content of a file, creating a file, changing a list of files in a directory, or creating a file system.

In an embodiment, prior to said generating, by program code configured to execute in the client computing device, a mock upload event and a corresponding mock data transfer object for uploading data using the web page, the method further comprises: intercepting, by an embedded upload event listener, a received upload event; reading, the received upload event; dropping the received upload event from an upload event handler pipeline; and calling synchronously or asynchronously, by the embedded event listener, code to perform logic on the received upload event for said generating.

In an embodiment, said embedded upload event listener is registered to be executed prior to any other event listeners of the web page.

In an embodiment, the method further comprises: sending, to a proxy server, a query including metadata about the received upload event; and receiving, from the proxy server, a response to the query including instructions. Said generating, by program code configured to execute in the client computing device, a mock upload event and a corresponding mock data transfer object for uploading data using the web page is based on the instructions received from the proxy server.

In an embodiment, the mock upload event generator includes at least one of: script browser extension code; script code that alters a received event; new script code; script code injected as a hook library in the web page.

In an embodiment, the mock upload event generator is script code of a scripting language.

In an embodiment, a computer-readable medium having program code recorded thereon that when executed by at least one processor causes the at least one processor to perform a method, the method comprises: rendering a web page in a browser of the client computing device; generating, by program code configured to execute in the client computing device, a mock upload event and a corresponding mock data transfer object for uploading data using the web page; propagating the mock upload event and the corresponding mock data transfer object to an upload event listener of the web page; and executing the mock upload event.

In an embodiment, prior to said generating, by program code configured to execute in the client computing device, a mock upload event and a corresponding mock data transfer object for uploading data using the web page, the method further comprises: intercepting, by an embedded upload event listener, a received upload event; reading the received upload event; dropping the received upload event from an upload event handler pipeline; and calling synchronously or asynchronously, by the embedded event listener, code to perform logic on the received upload event for said generating.

In an embodiment, the method further comprises: sending, to a proxy server, a query including metadata about the received upload event; and receiving, from the proxy server, a response to the query including instructions. Said generating, by program code configured to execute in the client computing device, a mock upload event and a corresponding mock data transfer object for uploading data using the web page is based on the instructions received from the proxy server.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system in a client computing device, comprising:
an embedded upload event listener configured to:
  intercept a received upload event;
  read the received upload event; and
  drop the received upload event from an upload event handler pipeline;
a mock upload event generator including program code configured to generate a mock upload event and a corresponding mock data transfer object for uploading data using a web page, the mock upload event a replacement for the dropped upload event, wherein the program code is configured to execute in the client computing device;
a dispatcher configured to propagate the mock upload event and the corresponding mock data transfer object to an upload event listener of the web page; and
an event handler configured to execute the mock upload event.

2. The system of claim 1, wherein the data includes a file, a plurality of files, a directory, or a plurality of directories.

3. The system of claim 1, wherein the mock upload event performs at least one of:
modifying a file,
changing a file name,
changing content of a file,
creating a file,
changing a list of files in a directory, or
creating a file system.

4. The system of claim 1, wherein the embedded upload event listener is further configured to:
call, synchronously or asynchronously, the program code to perform logic on the received upload event.

5. The system of claim 4, wherein the program code configured to generate a mock upload event and a corresponding mock data transfer object for uploading data using the web page is configured to modify the received upload event.

6. The system of claim 4, wherein the embedded upload event listener is configured to respond to a drag-and-drop input or a selection input in a dialog element input of the web page.

7. The system of claim 4, wherein the embedded upload event listener is registered to be executed prior to any other event listeners of the web page.

8. The system of claim 4, wherein the mock upload event generator is configured to:
send, to a proxy server, a query including metadata about the received upload event; and
receive, from the proxy server, a response to the query including instructions;
wherein the mock upload event generator including program code is further configured to generate the mock upload event and the corresponding mock data transfer object based on the instructions received from the proxy server.

9. The system of claim 1, wherein the mock upload event generator includes at least one of:
script browser extension code;
script code that alters a received event;
new script code; or
script code injected as a hook library in the web page.

10. The system of claim 1, wherein the mock upload event generator is script code of a scripting language.

11. A method in a client computing device, comprising:
intercepting a received upload event;
reading the received upload event;
dropping the received upload event from an upload event handler pipeline;
generating a mock upload event and a corresponding mock data transfer object for uploading data using a web page, the mock upload event a replacement for the dropped upload event;
propagating the mock upload event and the corresponding mock data transfer object to an upload event listener of the web page; and
instructing the upload event listener for execution of the mock upload event.

12. The method of claim 11, wherein the mock upload event performs at least one of:
modifying a file,
changing a file name,
changing content of a file,
creating a file,
changing a list of files in a directory, or
creating a file system.

13. The method of claim 11, wherein prior to said generating a mock upload event and a corresponding mock data transfer object for uploading data using the web page, the method further comprises:
calling synchronously or asynchronously, by an embedded upload event listener, code to perform logic on the received upload event for said generating.

14. The method of claim 13, wherein said embedded upload event listener is registered to be executed prior to any other event listeners of the web page.

15. The method of claim 13, further comprising:
sending, to a proxy server, a query including metadata about the received upload event; and
receiving, from the proxy server, a response to the query including instructions;
wherein said generating a mock upload event and a corresponding mock data transfer object for uploading data using the web page is based on the instructions received from the proxy server.

16. The method of claim 11, wherein the mock upload event generator includes at least one of:
script browser extension code;
script code that alters a received event;
new script code; or
script code injected as a hook library in the web page.

17. The method of claim 11, wherein the mock upload event generator is script code of a scripting language.

18. A physical hardware computer-readable medium having program code recorded thereon that when executed by at least one processor causes the at least one processor to perform a method, the method comprising:
intercepting a received upload event;
reading the received upload event;
dropping the received upload event from an upload event handler pipeline;
generating a mock upload event and a corresponding mock data transfer object for uploading data using a web page, the mock upload event a replacement for the dropped upload event;

propagating the mock upload event and the corresponding mock data transfer object to an upload event listener of the web page; and instructing the upload event listener for execution of the mock upload event.

19. The physical hardware computer-readable medium of claim 18, wherein prior to said generating a mock upload event and a corresponding mock data transfer object for uploading data using the web page, the method further comprises:

calling synchronously or asynchronously, by an embedded upload event listener, code to perform logic on the received upload event for said generating.

20. The physical hardware computer-readable medium of claim 19, further comprising:

sending, to a proxy server, a query including metadata about the received upload event; and receiving, from the proxy server, a response to the query including instructions;

wherein said generating, by program code configured to execute in a client computing device, a mock upload event and a corresponding mock data transfer object for uploading data using the web page is based on the instructions received from the proxy server.

\* \* \* \* \*